United States Patent
McAllister et al.

[11] Patent Number: 6,086,034
[45] Date of Patent: *Jul. 11, 2000

[54] INDEPENDENTLY ADJUSTABLE MOUSE PAD

[75] Inventors: Michael L. McAllister, Harleysville; David A. Bloom, Alburtis; Jeffrey P. Lee, Easton, all of Pa.

[73] Assignee: Knoll, Inc., East Greenville, Pa.

[*] Notice: This patent is subject to a terminal disclaimer.

[21] Appl. No.: 08/978,225

[22] Filed: Nov. 25, 1997

Related U.S. Application Data

[63] Continuation of application No. 08/608,261, Feb. 28, 1996, Pat. No. 5,730,408.

[51] Int. Cl.⁷ .................................................. E04G 3/00
[52] U.S. Cl. ................ 248/278.1; 248/118; 248/346.01; 248/918
[58] Field of Search .................. 248/118, 118.1, 248/118.3, 918, 288.51, 458, 639, 662, 278.1, 279.1, 346.01; 108/143, 138, 140, 65, 69

[56] References Cited

U.S. PATENT DOCUMENTS

| | | | |
|---|---|---|---|
| 1,689,939 | 4/1928 | Welling . | |
| 4,122,956 | 10/1978 | Hargrove | 211/131 |
| 4,500,060 | 2/1985 | Anderson et al. | 248/349 |
| 4,616,798 | 10/1986 | Smeenge et al. | 248/281.1 |
| 4,645,153 | 2/1987 | Granzow et al. | 248/178 |
| 4,645,155 | 2/1987 | Eldon et al. | 248/278 |
| 4,672,898 | 6/1987 | Davidson | 108/6 |
| 4,706,919 | 11/1987 | Soberalski et al. | 248/918 X |
| 4,733,618 | 3/1988 | Sarro et al. | 108/140 |
| 4,770,382 | 9/1988 | Lehti | 248/181 |
| 4,844,388 | 7/1989 | Kuba et al. | 248/231.61 X |
| 4,863,124 | 9/1989 | Ball et al. | 108/28 |
| 4,974,808 | 12/1990 | Ball | 248/917 |
| 4,986,503 | 1/1991 | Kabat | 248/181 |
| 5,037,054 | 8/1991 | McConnell | 248/918 X |
| 5,048,784 | 9/1991 | Schwartz et al. | 248/244 |
| 5,072,905 | 12/1991 | Hyatt | 248/118 |
| 5,158,256 | 10/1992 | Gross | 248/118.3 |
| 5,161,760 | 11/1992 | Terbrack | 248/116 |
| 5,161,766 | 11/1992 | Arima | 248/447 |
| 5,271,593 | 12/1993 | Kinner et al. | 248/442.2 |
| 5,281,001 | 1/1994 | Bergsten et al. | 248/118 X |
| 5,320,317 | 6/1994 | Hyatt | 248/118.1 |
| 5,340,075 | 8/1994 | Schriner | 248/346 |
| 5,342,006 | 8/1994 | Tice | 248/118 |
| 5,398,896 | 3/1995 | Terbrack | 248/918 X |
| 5,398,901 | 3/1995 | Brodmann et al. | 248/288.1 |
| 5,553,820 | 9/1996 | Karten et al. | 248/276.1 X |
| 5,564,667 | 10/1996 | Copeland et al. | 248/278.1 |
| 5,730,408 | 3/1998 | McAllister et al. | 248/228.51 |

FOREIGN PATENT DOCUMENTS 1017328  12/1952  France ........................... 248/288.51

*Primary Examiner*—Ramon O. Ramirez
*Attorney, Agent, or Firm*—Buchanan Ingersoll, P.C.

[57] ABSTRACT

A mouse pad support is mounted on a keyboard support that has a keyboard support arm attachable to a fixed structure such as the underside of a desk top, and a tiltable keyboard support platform thereon. A mouse pad support arm is coupled to the keyboard support arm via a rotational swivel fitting with a vertical axis for moving the mouse pad arm and mouse pad support table to any position around the keyboard in a circular arc in a horizontal plane. The height of the swivel fitting is adjustably fixed over a range. The mouse pad arm is kept in a horizontal plane because its rotational coupling to the keyboard support arm is made at an angularly fixed part on the keyboard support arm, such as on a parallelogram linkage associated with setting the elevation of the keyboard platform. The keyboard platform tilts relative to the angularly fixed part, whereby mouse position is independent of keyboard platform tilt. The mouse support arm is long enough for the mouse support table to clear the corners of the keyboard platform, but the mouse support table also is adjustably attached to the mouse pad support arm via an off-center rotational joint such that the spacing between the mouse pad and the keyboard can be adjusted by rotating the mouse support table. This off-center joint preferably employs a ball and socket universal joint with a friction adjustment, enabling an adjustable degree of tilt of the mouse pad support table as well.

20 Claims, 2 Drawing Sheets

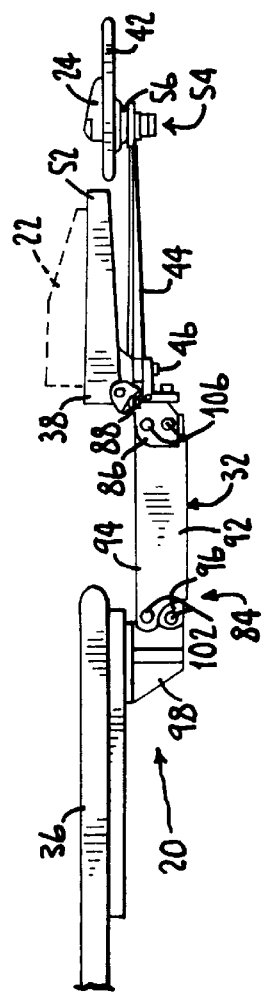
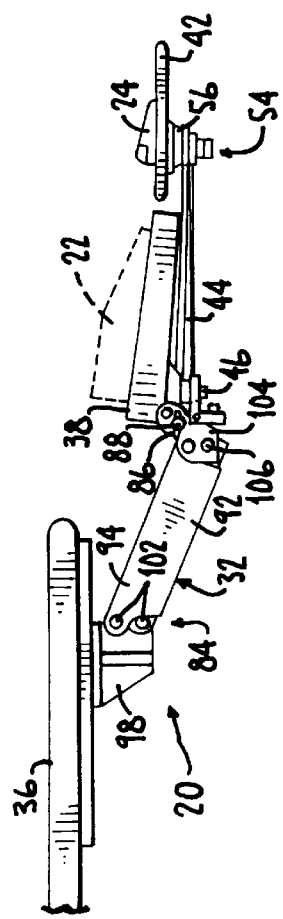
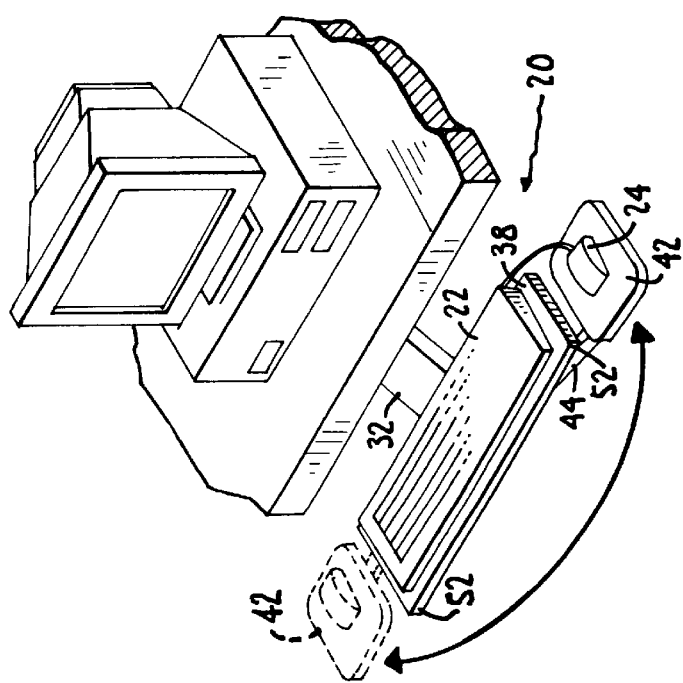

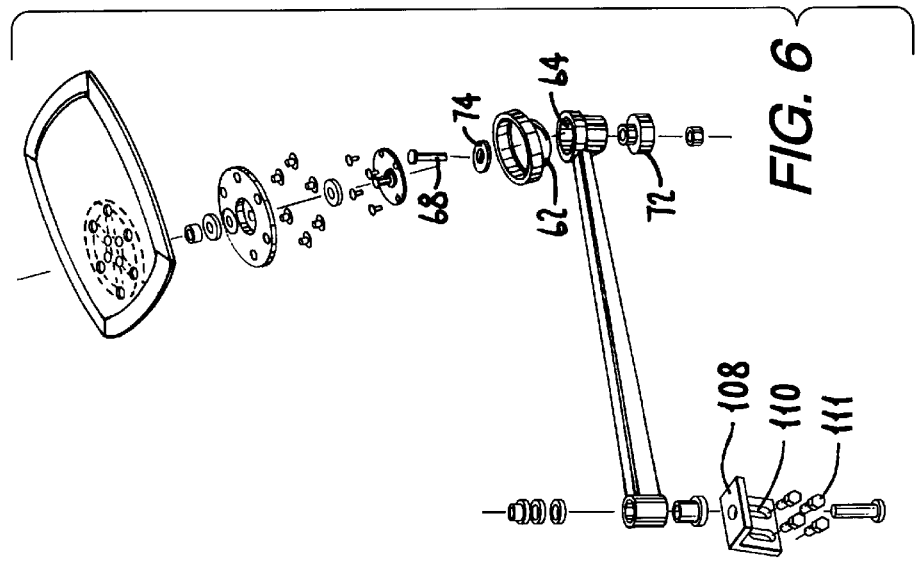
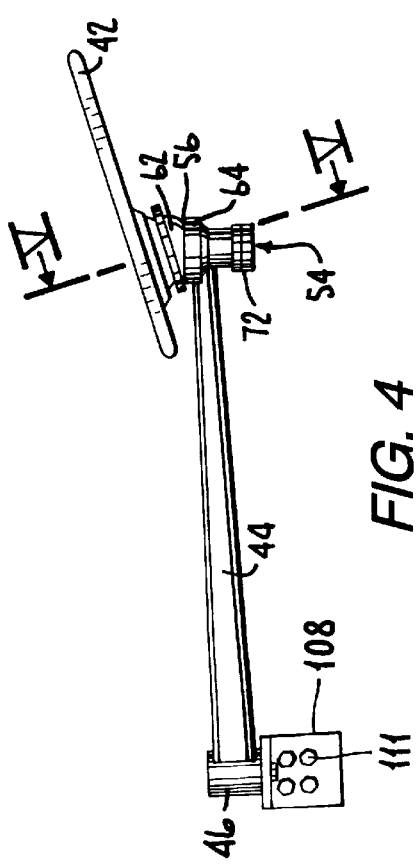
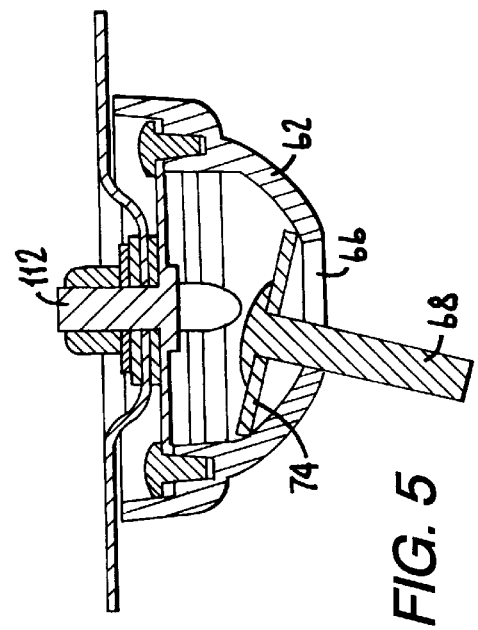
FIG. 6
FIG. 4
FIG. 5

INDEPENDENTLY ADJUSTABLE MOUSE PAD

This application is a continuation of application Ser. No. 08/608,261 filed Feb. 28, 1996, now U.S. Pat. No. 5,730,408.

BACKGROUND OF THE INVENTION

1. Field of the Invention

The invention concerns a mouse pad support or auxiliary table rotatably attached at the end of a swivel arm, in turn attached on a vertical swivel axis to an angularly fixed part of a keyboard support arm. The mouse pad table can be placed where desired in an arc around a keyboard, and is independent of any tilt of the keyboard platform. The table is coupled to the arm by an off-center rotational joint, such that rotation of the table changes the lateral spacing between the mouse pad and the keyboard, and can permit an overlap. The table can be mounted via a frictionally adjustable ball and socket to be locked at a tilt, if desired.

2. Prior Art

Computer work stations often have an associated pointing device such as a mouse or trackball that has a housing separate from the computer keyboard and is wired to the computer. In this disclosure, any such device is generally termed a mouse. A mouse provides a means for producing a two dimensional displacement signal that is used to control the position of a screen cursor as needed to highlight, move ("drag") or select ("click on") selected icons, text or the like, as well as for drawing and other uses. A typical mouse is movable over a surface or mouse pad for providing the signal and has one or more pushbuttons. The mouse must be manually accessible to the user of the work station.

A mouse is advantageously located closely adjacent to the computer keyboard so that the user can readily move his or her hand back and forth between the keyboard and the mouse. If the keyboard is on a table top, the mouse can be placed on the same work surface as the keyboard, to the right or left of the keyboard depending on the user's preference. Usually the mouse is moved over a plastic or fabric-faced mouse pad.

If the mouse pad is located too far from the keyboard or if the location is otherwise inaccessible, operation is inconvenient as the user alternates between use of the keyboard and use of the mouse. Advantageously, the user should be able to switch back and forth without even looking at either of the mouse and the keyboard.

Where the keyboard is on a desk surface, a mouse pad can be placed immediately alongside the keyboard. Often, however, the keyboard is carried on a movable keyboard support with a platform on a keyboard support arm attached under the desk top so that the keyboard can be moved as needed. A keyboard support arm may freely or frictionally or controllably fix the keyboard, usually set on a keyboard support platform, at any desired elevation in a range (especially below the level of the work surface), forward or backward relative to the edge of the work surface, and/or at a selected degree of tilt forward or backward and/or laterally. Adjustments in the keyboard support position produce problems with respect to where the mouse pad is located and how the mouse is used.

Often there is insufficient room on the keyboard support platform to fit both a keyboard and a mouse pad. The keyboard substantially encompasses the platform, whereas a mouse pad encompasses, for example, about 20 by 25 cm of area in which the mouse can be moved about. It is known to provide an auxiliary table to support a mouse pad or to function as a mouse pad, and to attach the auxiliary table to the keyboard platform so the mouse pad is carried along with the keyboard when the keyboard platform is repositioned. For example, the keyboard platform can have a drawer-like laterally extendible mouse pad panel located below the keyboard. An auxiliary panel or table can be mounted to the keyboard platform by a telescoping rod that can be locked at a particular position using a thumbscrew, etc.

These solutions are not as convenient as they might be, because repositioning the keyboard platform in certain desirable ways such as forward/rearward tilting, also repositions the mouse pad in ways that are not desirable. For example, tilting the keyboard platform also tilts the mouse pad and can cause the mouse to slide off the mouse pad. It is possible, for example with a telescoping rod structure, to readjust the mouse pad after moving the keyboard, but this is inconvenient and may require that the mouse be removed until the mouse pad is repositioned after the keyboard is moved.

A mouse pad preferably is fixed substantially horizontally at or slightly above the elevation of the keyboard. The mouse pad is located adjacent to the keyboard, such as along an arc around the user's elbow having a radius equal to the length of the forearm. This permits the user to switch quickly between the keyboard and the mouse. Nevertheless, users differ in size, left or right-handedness and their various preferences. A right handed user may wish temporarily to operate a mouse with the left hand, for example when operating a numeric keypad with the right hand. As a result, some adjustability is advantageous. What is needed is to provide a mouse pad support that is versatile and convenient to adjust to fit the size and preferences of an individual user, but at the same time minimizes the need for readjustments.

SUMMARY OF THE INVENTION

It is an object of the invention to mount a mouse pad or mouse pad support table on a keyboard support arm, such that the mouse pad is conveniently positionable around the keyboard for use by left or right handed users, at the required location, spacing and tilt to suit their respective size and preferences.

It is a further object of the invention to provide a durable and stable mouse pad mounting structure able to bear a certain amount of weight without excessive vertical displacement.

It is another object to minimize the extent to which repositioning of a keyboard support platform requires corresponding repositioning of a mouse pad or mouse pad supporting table.

It is also an object of the invention to mount a mouse pad support table on a vertical axis swivel arm attached to an angularly fixed member of a keyboard support.

It is still another object of the invention to permit close adjustment of the distance between the keyboard and the mouse pad, potentially with a capability to overlap the keyboard, by providing an off-center rotational connection between the mouse pad support and the swivel arm.

It is a further object to connect such a mouse pad support to the swivel arm so as to permit vertical height adjustment and frictionally lockable adjustment of tilt.

These and other objects are accomplished by a mouse pad support used in conjunction with a keyboard support that has a keyboard support arm attachable to a fixed structure such as the underside of a desk top. The arm is arranged to carry a keyboard, for example on a keyboard support platform, and can have various adjustments in height, lateral or longitudinal displacement or orientation and tilt.

A mouse pad support arm is coupled to the keyboard support arm via a swivel fitting having a vertical axis. The mouse pad arm is rotatable on the axis to position a mouse pad support table at any position around the keyboard along a circular arc. The swivel coupling of the mouse pad support arm and the keyboard support arm is made at an angularly fixed point on the keyboard support arm, such as on a part of a parallelogram linkage that carries a tilting mechanism for the keyboard platform. The swivel coupling is thereby fixed with a vertical axis for maintaining the mouse pad table in a horizontal plane independent of tilting of the keyboard platform. The swivel coupling can permit adjustment of the vertical height of the mouse pad arm.

The mouse support arm is long enough that the mouse support table can clear the corners of the keyboard platform, but the mouse support table also is adjustably attached to the mouse pad support arm via an off-center rotational joint such that the spacing between the mouse pad and the keyboard can be adjusted by rotating the mouse support table. A ball and socket universal joint can be included, with a frictional adjustment enabling an adjustable degree of tilt of the mouse pad support table. Accordingly, the mouse support table can be swiveled laterally, rotated to set its spacing from the keyboard, raised or lowered and tilted.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view showing the mouse support table according to the invention, mounted on a keyboard support arm.

FIG. 2 is a partial side elevation showing the keyboard support in a first position.

FIG. 3 is a side elation as in FIG. 2, with the keyboard support displaced downwardly on its support arm and tilted.

FIG. 4 is an elevation view of the mouse support of a preferred embodiment of the mouse support.

FIG. 5 is a partial section view of the universal joint, taken along line 5—5 in FIG. 4.

FIG. 6 is an exploded perspective view detailing the swivel and rotational joint parts of the embodiment according to FIG. 4.

DETAILED DESCRIPTION OF THE PREFERRED EMBODIMENTS

Referring to FIG. 1, a workstation support 20 is provided for a keyboard. 22 and a mouse 24 to be used in conjunction. The keyboard support comprises a keyboard support arm 32 attached at its proximal end to a fixed structure such as the underside of a desk top 36 and supporting a platform 38 at its distal end. Keyboard. platform 38 can be larger or smaller and can attach to the keyboard, but is illustrated, for example, as a simple platform on which keyboard 22 is rested.

A mouse support table 42 is mounted on workstation support 20 by a swivel arm 44, and can be swivelled in a horizontal plane for locating mouse support table 42 at a desired point along a circular arc centered on the midline of platform 38. Thus, the mouse pad table can be placed on the left or right or elsewhere as desired. Mouse pad table 42 can have a plastic or fabric surface for interacting with the sensing ball of the mouse, or simply can be dimensioned to receive a pad (not shown) for the mouse. A suitable mouse pad is about 20×25 cm in area. Of course the mouse pad table can support other forms of pointing devices as well, such as a trackball housing.

The swivelling mouse support arm 44 is attached at one end to mouse table 42, and at an opposite end to keyboard support arm 32. FIGS. 2 and 3 illustrate the particulars of the attachment, which is made in a manner that maintains the swivel plane of mouse table 42 horizontal regardless of vertical displacement, tilting and similar movement of keyboard platform 38 on keyboard support arm 32. The mouse table 42 is generally in the same horizontal plane as platform 38, but as discussed below, the relative elevations of platform 38 and table 42 can be determined in part by providing for a vertical range over which mouse support arm 44 can be attached to keyboard support arm 32.

Mouse swivel arm 44 is attached to keyboard support arm 32 via a swivel connection 46 having a vertical axis, at a part of keyboard support arm 32 that maintains a given orientation. Therefore, the swivel axis remains vertical even if the keyboard platform is moved. In FIG. 2, keyboard support arm 32 is holding keyboard platform 38 horizontally at the level of desk top 36 and at the full extensions of a sliding and rotational carriage on a track under the desk top. In FIG. 3, keyboard platform 38 has been tilted forward, lowered and displaced rearwardly. However, mouse pad support table 42 remains usefully positioned adjacent to the keyboard.

Mouse support arm 44 has rotational fittings 46, 54 at each end. At the connection with keyboard support arm 32, the vertical axis swivel fitting causes the mouse arm 44 to rotate around the vertical swivel axis in a horizontal plane. Mouse support arm is long enough that mouse table 42 clears the front corners 52 of keyboard 22 and/or keyboard platform 38 (see also FIG. 1), when swivelled in the circular arc around the keyboard support platform. In this manner the mouse pad table can be placed on one lateral side or the other as shown in solid and dash lines in FIG. 1, to suit left hand and right hand use.

The mouse support table likewise is mounted on the distal end of the mouse support arm by a rotational fitting 54. This permits mouse table 42 to be rotated relative to mouse arm 44. The rotational fitting 54 can be carried on a ball and socket or universal joint 56, for setting the desired alignment of mouse table 42 relative to keyboard platform 38 when in any position around the circular arc. The particulars of the ball and socket and rotational joints are shown in detail in FIGS. 4–6. Adjustment of the ball and socket permits setting the mouse support table 42 at a desired tilt, for example inwardly toward the keyboard as shown in FIG. 4. Adjustment around the rotational joint changes the spacing between mouse pad table 42 and platform 38 because the rotational joint is off-center on table 42.

Means are provided for adjustably fixing the tilt orientation of the mouse support table by controllably locking or loosening universal joint 56, such as a frictional attachment that can be overcome with moderate force, or preferably a knob or lever controlled adjustment whereby the joint can be released or loosened for repositioning, and then relocked. In the embodiment shown, a knob-controlled threadable structure 68 is adjustable by the user for compressing or drawing together parts 74, 62, 64 of universal joint 56 such that the universal joint is frictionally locked or loosened for repositioning.

Universal joint 56 is formed by a ball member 62 and a complementary socket member 64. The ball member is hollow as shown in FIG. 5, and having a central opening 66 facing toward the socket member. The threadable structure comprises a, bolt 68 extending through the central opening in ball member 62 and a corresponding smaller opening in the socket member, as shown in exploded view in FIG. 6. A knob 72 is threaded on bolt 68 below socket member 64 for adjusting the pressure between the ball member and the socket member to set a desired frictional engagement. Bolt 68 is attached to a pressure disc 74 disposed inside the hollow ball member 62. Thus tightening or loosening the knob pulls the ball member more or less tightly into the socket for frictional adjustment. It would also be possible to provide a bolt that is, threaded into the pressure disc or other internal part, in which case the knob would be fixed on the bolt instead of threaded as in the embodiment shown.

According to an aspect of the invention, the position of mouse support table 42 is made independent of keyboard tilt while nevertheless keeping the mouse support table adjacent to keyboard 22. It is possible, but not necessary, to readjust mouse support table 42 when changing the height or tilt of keyboard support platform 38 and keyboard 22 thereon. Referring again to FIGS. 1–3, the keyboard support is attached to the underside of desk top 36 or the like at a pivot coupling 84 on a horizontal axis, whereby the height of the keyboard is changed by raising or lowering the keyboard support platform by causing keyboard support arm 32 to pivot on the horizontal axis under desk top 36.

There are a variety of possible specific keyboard support arm arrangements, for example enabling fore-and-aft sliding, lateral displacement, rotation, etc., as shown generally in FIGS. 2 and 3. However, in order to avoid introducing a tilt when keyboard platform 38 is lowered by pivoting keyboard support arm 32 downwardly, the keyboard support arm has an angularly fixed part 86 and the tilting control for the keyboard is disposed between this angularly fixed part and the keyboard support platform, being shown generally by a slot and pin arrangement 88 having a limited angular span. Provided the slot and pin arrangement is not moved, the keyboard tilt remains the same as the keyboard is raised or lowered.

A typical keyboard support arm structure to provide the angularly fixed structure comprises a parallelogram linkage 92. The keyboard support arm 32 comprises an upper arm member 94 and a lower arm member 96, such as two square channels of which one fits inside the other. The upper and lower arm members 94, 96 are each pivoted to a base 98 under desk top 36 at horizontal pivot pins 102 that are spaced from one another, e.g., vertically spaced, and fixed in position. Likewise, on their ends adjacent to the keyboard support platform, the upper and lower arm members are pivoted to a linking fitting 104 (which can be the angularly fixed part 86) by two horizontal pivot pins 106 that are spaced along a line parallel to that of the fixed pivot pins 102 under desk top 36. As the keyboard support platform 38 is raised and lowered, linking fitting 104 and its two pivot pins 106 remain at the same alignment because their alignment is fixed by upper and lower arm members 94, 96 and the fixed pivot pins 102 under desk top 36 in the manner of an expanding or collapsing parallelogram having one stationary side, namely at fixed pins 102 attached to the underside of desk top 36.

The vertical axis swivel fitting 46 for mouse support arm 44 is attached to the angularly fixed part 86 at the movable end of keyboard support arm 32. Thus as the keyboard is raised or lowered, the elevation of the mouse pad table and its mounting changes together with that of the keyboard. Preferably, this attachment is made by an angled bracket 108 in a manner that permits vertical adjustment to set the relative heights of mouse table 42 and platform 38, e.g., by providing vertically elongated slots 110 for receiving screws 111 attaching the swivel fitting 46 to the angularly fixed part 86. Of course the mouse pad support is also carried along with any lateral or fore-and-aft displacement of the keyboard support that may be provided. The keyboard support platform 38 is independently tiltable on a horizontal axis relative to the angularly fixed part of the keyboard support arm by the circular arc slot and pin arrangement 88 or a similar preferably-frictional adjustment between the keyboard support platform and the angularly fixed linking fitting 104 to which mouse support arm 44 is mounted at the swivel 46. Whereas the angularly fixed linking fitting carries the mouse support arm, the keyboard platform is tiltable while the angular orientation of the mouse support table remains the same. It is not necessary to reposition the mouse support table when changing the tilt of the keyboard, as would be the case if the mouse support table were attached to the keyboard support platform.

The mouse pad table 42 is mounted to the mouse support arm 44 by rotational fitting 54. This permits the user to rotate the mouse pad, for example to position a flat edge of the mouse pad table against an edge of the keyboard, or at some other convenient angle, when the mouse pad support arm has been repositioned. According to a further aspect of the invention, the rotational fitting between mouse pad table 42, and mouse pad support arm 44 is off-center on mouse pad support table 42 as best shown in FIGS. 4 and 6. The mouse support arm 44 is a rigid element, and would invariably set the position of the mouse pad support table at a given distance from keyboard 22. However, the off-center axis of the rotational joint is such that the user can vary the distance between the edge of mouse pad support table 42 and keyboard 22 by rotating mouse pad support table 42 on its off-center rotational fitting. More particularly, the spacing between mouse table 42 and keyboard 22 can selectively be increased by rotating table 42 to orient the edge of the table nearest to joint 56 toward the keyboard, or decreased by orienting another of the edges toward the keyboard.

The device can be dimensioned such that mouse pad support table 42 is placed at a level slightly higher than the top of platform 38 and/or keyboard 22, or at the same level. When placed higher, the off-center mounting and mouse pad dimensions can be made sufficient that rotating mouse pad support table 42 on its rotational joint causes the mouse pad table to extend over an edge of platform 38. For example, the table can be positioned to extend over part of the usual numeric keypad at the side of a standard PC keyboard, etc., such that users who seldom use the numeric keypad can bring the mouse even closer into reach.

Whereas the off-center rotational joint at the mouse pad support table is a universal joint in the embodiment shown, the mouse pad table can be inclined if desired as well as rotated. In the embodiment shown in FIGS. 4–6, a rotatable universal joint is provided in the form of a ball and socket joint with a friction adjusting bolt and knob arrangement as discussed above. The joint can have a limited degree of tilt, for example defined by the size of the opening in the ball member through which the bolt extends, limiting the range of tilt to ±15°, which is normally sufficient that the mouse will not tend to slide off the pad.

Referring to FIG. 5, the rotatable joint at the table can have two rotation axes as opposed to one. According to this embodiment, the ball and socket members are relatively rotatable on connecting bolt 68 that also controls their frictional engagement and maintains a vertical rotation axis. However, the ball member is also coupled to the underside of mouse pad table 42 on a second bolt or pin 112, such that the mouse pad table is rotatable relative to the universal ball and socket joint and is also rotatable on the second bolt or pin, namely on an axis perpendicular to the tiltable plane of the mouse pad table. Either or both of these rotational arrangements can be used according to the invention.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A mouse support for a computer mouse to be used in conjunction with a movable keyboard support, wherein said movable keyboard support includes a movable keyboard support arm having a proximal part for attachment to a fixed structure and a distal keyboard-support forming a movable platform for supporting a keyboard, the mouse support comprising:

a mouse support arm having a proximal end and a distal end;

a mouse support table attached to the distal end of the mouse support arm; and a swivel fitting for attaching the proximal end of the mouse support arm to a movable portion of the keyboard support wherein the swivel fitting defines a vertical rotation axis and the mouse support arm has a length such that the mouse support arm is capable of rotating the mouse support table in a circular arc in substantially a horizontal plane around the keyboard support from one lateral side thereof to another.

2. The mouse support of claim 1, further comprising a universal joint attaching the mouse support table to the distal end of the mouse support arm.

3. The mouse support of claim 2, further comprising means for adjustably fixing an orientation of the mouse support table relative to the universal joint.

4. The mouse support of claim 3, wherein the means for adjustably fixing the orientation of the mouse support table comprises a threadable structure for compressing at least a part of the universal joint such that the universal joint is frictionally locked.

5. The mouse support of claim 4, wherein the universal joint comprises a ball member and a complementary socket member and the threadable structure comprises a bolt through the ball member and the socket member and a knob threaded on the bolt for adjusting pressure between the ball member and the socket member to set a desired frictional engagement of the universal joint.

6. The mouse support of claim 5, further comprising a pressure disc disposed inside the ball member, and wherein the bolt engages with the pressure disc.

7. The mouse support of claim 2, wherein the universal joint is mounted off center on an underside of the mouse support table and the universal joint is rotatable, whereby the mouse support table is rotatable on the universal joint relative to the movable keyboard support.

8. The mouse support of claim 1, wherein the swivel fitting is attachable to an angularly fixed part of the moveable keyboard support arm to counteract tilting of the movable keyboard support platform, so as to maintain an orientation of the mouse support table when the movable keyboard support is titled.

9. The mouse support of claim 8, further comprising means for adjustably fixing the swivel fitting over a range of height relative to the movable keyboard support arm, whereby the mouse support table is positionable at a selectable elevation relative to the movable keyboard support.

10. The mouse support of claim 1, further comprising a rotational fitting attaching the mouse support table to the distal end of the mouse support arm.

11. The mouse support of claim 1, further comprising a rotational fitting having a vertical axis attaching the mouse support table to the distal end of the mouse support arm, whereby the mouse support table is rotatable on the vertical axis relative to the movable keyboard support.

12. The mouse support of claim 11, wherein the mouse support arm is attachable at the proximal end of the mouse support arm to the movable keyboard support arm adjacent to the movable keyboard support platform, whereby the mouse support table is rotatable around the movable keyboard support platform.

13. The mouse support of claim 11, wherein a spacing of the mouse support table is adjustable relative to the movable keyboard support platform.

14. The mouse support of claim 13, further comprising a universal joint attaching the mouse support table to the distal end of the mouse support arm and a threadable structure for compressing at least a part of the universal joint such that the universal joint is frictionally locked for adjustably fixing an orientation of the mouse support table relative to the universal joint.

15. The mouse support of claim 13, further comprising a universal joint attaching the mouse support table to the distal end of the mouse support arm wherein the universal joint is mounted off center on an underside of the mouse support table and the universal joint is rotatable, whereby the mouse support table is rotatable on the universal joint relative to the movable keyboard support.

16. The mouse support of claim 11, wherein the swivel fitting is attachable to an angularly fixed part of the movable keyboard support arm to counteract tilting of the movable keyboard support platform, so as to maintain an orientation of the mouse support table when the movable keyboard support is titled.

17. The mouse support of claim 16, further comprising means for adjustably fixing the swivel fitting over a range of height relative to the movable keyboard support arm, whereby the mouse support table is positionable at a selectable elevation relative to the movable keyboard support.

18. The mouse support of claim 11, further comprising a universal joint attaching the mouse support table to the distal end of the mouse support arm, wherein the universal joint is mounted off center on an underside of the mouse support table and the universal joint is rotatable, whereby the mouse support table is rotatable on the universal joint to adjust a lateral spacing between an edge of the mouse support table relative to the movable keyboard support.

19. The mouse support of claim 1, wherein the mouse support arm is attachable at the proximal end of the mouse support arm to the movable keyboard support arm, whereby the mouse support table is rotatable around the movable keyboard support platform.

20. The mouse support of claim 1, further comprising a rotational fitting attaching the mouse support table to the distal end of the mouse support arm, the rotational fitting having a vertical axis disposed off-center between edges of the mouse support table, whereby the mouse support table is rotatable on the vertical axis relative to the movable keyboard support.

* * * * *

UNITED STATES PATENT AND TRADEMARK OFFICE
CERTIFICATE OF CORRECTION

PATENT NO. : 6,086,034
DATED : July 11, 2000
INVENTOR(S) : MICHAEL L. MCALLISTER, DAVID A. BLOOM, JEFFREY P. LEE It is certified that error appears in the above-indentified patent and that said Letters Patent is hereby corrected as shown below:

At [56] References Cited, Patent No. 1,689,939, change "4/1928" to --10/1928--.

Signed and Sealed this

First Day of May, 2001

Attest:

NICHOLAS P. GODICI

Attesting Officer        Acting Director of the United States Patent and Trademark Office